(12) United States Patent
Dhaliwal et al.

(10) Patent No.: US 9,322,717 B1
(45) Date of Patent: Apr. 26, 2016

(54) TEMPERATURE SENSOR ARCHITECTURE

(71) Applicant: Marvell International Ltd., Hamiliton (BM)

(72) Inventors: Jasdeep Dhaliwal, San Jose, CA (US);
Shingo Hatanaka, San Jose, CA (US);
Ovidiu Carnu, San Francisco, CA (US);
Hung Sheng Lin, San Jose, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 488 days.

(21) Appl. No.: 13/858,879

(22) Filed: Apr. 8, 2013

Related U.S. Application Data

(60) Provisional application No. 61/622,881, filed on Apr. 11, 2012.

(51) Int. Cl.
*G01K 7/00* (2006.01)
(52) U.S. Cl.
CPC .......................................... *G01K 7/00* (2013.01)
(58) Field of Classification Search
CPC ........... G01K 7/00; G01K 7/021; G01K 7/14; G01K 2219/00
USPC .......................................... 374/163, 170, 171
See application file for complete search history.

(56) References Cited

U.S. PATENT DOCUMENTS

| | | | | |
|---|---|---|---|---|
| 7,891,868 B2* | 2/2011 | Sohn | ........................ | G11C 7/04 374/170 |
| 2003/0155903 A1* | 8/2003 | Gauthier | .................. | G01K 7/01 324/76.41 |
| 2005/0141589 A1* | 6/2005 | Kwon | ....................... | G01K 7/32 374/117 |
| 2007/0160113 A1* | 7/2007 | Kim | .......................... | G01K 7/01 374/178 |
| 2007/0180902 A1* | 8/2007 | Sherwood | ............... | A61F 7/007 73/204.26 |
| 2008/0071493 A1* | 3/2008 | Wang | ..................... | G01K 7/015 702/130 |
| 2010/0008160 A1* | 1/2010 | Lee | ......................... | G01K 15/00 374/1 |
| 2010/0109753 A1* | 5/2010 | Lee | ......................... | G01K 7/015 327/513 |
| 2010/0123510 A1* | 5/2010 | Yoshikawa | ............... | G01K 7/01 327/512 |
| 2010/0189160 A1* | 7/2010 | Kim | .......................... | G01K 7/32 374/170 |
| 2012/0189033 A1* | 7/2012 | Kim | ....................... | G01K 7/346 374/163 |
| 2012/0307866 A1* | 12/2012 | Chen | ..................... | G01K 15/005 374/170 |

\* cited by examiner

*Primary Examiner* — Lisa Caputo
*Assistant Examiner* — Philip Cotey

(57) ABSTRACT

A temperature sensor includes a current generator that detects a temperature and generates a temperature dependent current, the temperature dependent current having a current level corresponding to the detected temperature. A current-to-voltage converter converts the temperature dependent current into a temperature dependent voltage, the temperature dependent voltage having a voltage level corresponding to the detected temperature. A signal generator generates a pulse signal having a period determined from a voltage difference between the temperature dependent voltage and a reference voltage. A counter counts a number of cycles of a reference clock signal that occur during one cycle of the pulse signal to output a temperature code indicative of the temperature.

18 Claims, 7 Drawing Sheets

TEMPERATURE SENSOR ARCHITECTURE

CROSS REFERENCE TO RELATED APPLICATIONS

This application claims the benefit of and priority to U.S. Provisional Application 61/622,881, filed on Apr. 11, 2012, which is incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various types of temperature sensors can be used to measure a temperature change, by detecting material properties. Electrical temperature sensors, which detect a change in electrical material properties such as electrical resistance, are widely used. Examples of electrical temperature sensors include but are not limited to resistance temperature detectors (RTDs), thermistors, thermocouples, and semiconductor-junction temperature sensors.

Resistance values of resistive elements in RTDs and thermistors increase or decrease as a temperature increases. Semiconductor-junction devices (including diodes, metal-oxide-semiconductor field-effect transistors (MOSFET), and bipolar junction transistors (BJTs)) show a temperature dependent voltage-current behavior. For instance, a voltage across a p-n junction diode that is forward biased by a constant current, increases approximately linearly with decreasing temperature.

Such temperature dependent behavior of the electrical elements, can be used to generate a temperature dependent current i(T) that is proportional to absolute temperature ($I_{PTAT}$) or inversely proportional to absolute temperature ($I_{CTAT}$).

FIG. 1 illustrates a conventional digital temperature sensor device using a temperature dependent current i(T). The digital temperature sensor device 100 includes a temperature sensor 1-110, a current-to-voltage converter 1-120, and an analog-to-digital converter (ADC) 130.

The temperature sensor 1-110 generates the temperature dependent current i(T) that is proportional to absolute temperature ($I_{PTAT}$) or inversely proportional to absolute temperature ($I_{CTAT}$).

The current-to-voltage converter 1-120 converts the temperature dependent current i(T) generated by the temperature sensor 1-110, into a corresponding voltage V(T). Although a resistance value of a resistive element included in the current-to-voltage converter 1-120 may also vary according to a temperature change of the current-to-voltage converter 1-120, the temperature change is maintained within a sufficiently small range.

Thus, the resistance value typically remains at substantially the same value. Accordingly, the voltage V(T) generated by the current-to-voltage converter 1-120 shows substantially the same dependency on the temperature as the temperature dependent current i(T).

In analog temperature sensor devices, a temperature value (e.g. an analog value) corresponding to the current value i(T) or the voltage value V(T) is output. By contrast, in digital temperature sensors such as the digital temperature sensor device 100 of FIG. 1, the voltage V(T) is converted into an N-bit digital code (Tcode) using the ADC 130.

SUMMARY

This summary is provided to introduce subject matter that is further described below in the Detailed Description and Drawings. Accordingly, this Summary should not be considered to describe essential features nor used to limit the scope of the claimed subject matter.

An embodiment of the present disclosure is directed to a temperature sensor device including a signal generator and a counter.

An embodiment of the present disclosure is directed to a temperature sensor device including a signal generator and capable of compensating for an offset of an output signal by tuning a capacitor and/or current sources included in the signal generator.

In an embodiment, a temperature sensor device includes a signal generator configured to receive an input voltage indicative of a temperature and generate a pulse signal having a period determined from the input voltage, and a unit configured to output a temperature code based on the pulse signal, the temperature code being indicative of the temperature.

In another embodiment, a method includes receiving an input voltage indicative of a temperature, generating a pulse signal having a period determined from the input voltage, and outputting a temperature code based on the pulse signal, the temperature code being indicative of the temperature.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The details of one or more implementations are set forth in the accompanying drawings and the description below. Other features, aspects, and advantages may become apparent from the description, the drawings, and the claims.

Figure 1:
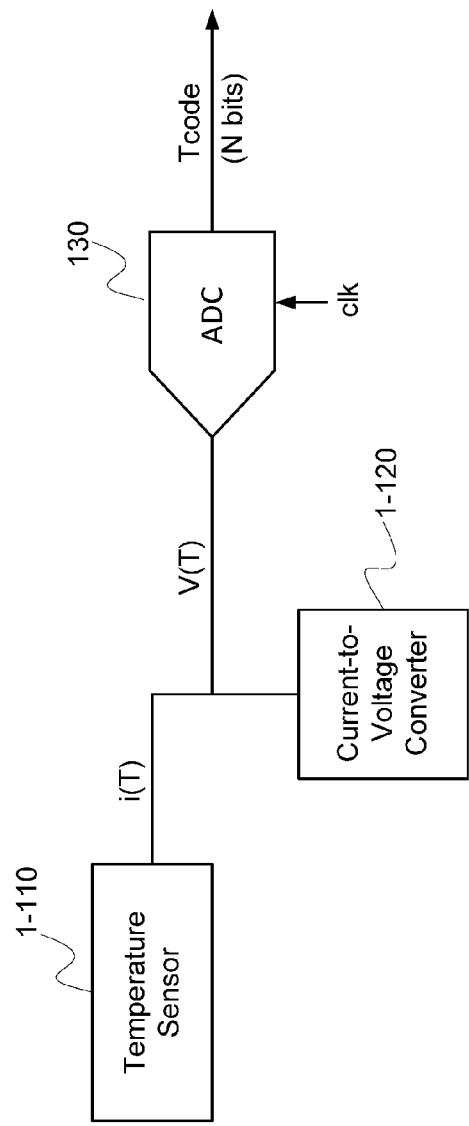
FIG. 1 is a block diagram of a conventional digital temperature sensor device.
Figure 2:
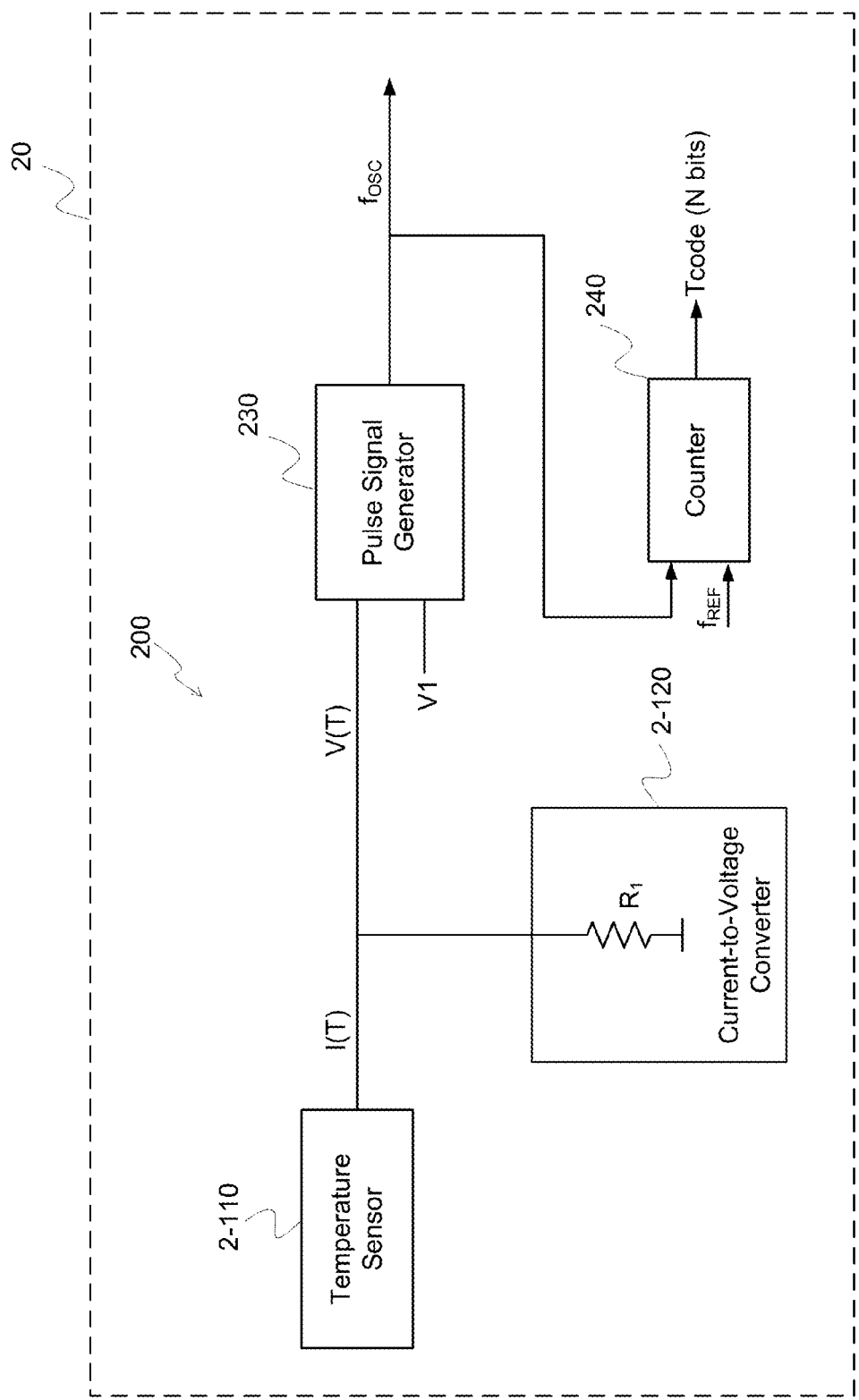
FIG. 2 is a block diagram of a system including a temperature sensor device in accordance with an embodiment of the present disclosure.

FIG. 2 is a block diagram of a system 20 including a temperature sensor device 200 in accordance with an embodiment of the present disclosure. In an embodiment, the system 20 may include a packaged semiconductor device, a semiconductor chip, an electronic component, or the like, that includes a temperature sensor.

The temperature sensor device 200 includes a temperature sensor 2-110, a current-to-voltage converter 2-120, a signal generator 230, and a counter 240.

The temperature sensor 2-110 detects a temperature and generates a temperature dependent current I(T). According to an embodiment of the present disclosure, the temperature dependent current I(T) includes a poly current proportional to temperature $I_{PTAT}$ or a poly current inversely proportional to temperature $I_{CTAT}$. In this embodiment, the temperature sensor 2-110 generates the poly current proportional to temperature $I_{PTAT}$ as the temperature dependent current I(T).

The current-to-voltage converter 2-120 is coupled to and disposed between the temperature sensor 2-110 and the signal generator 230. The current-to-voltage converter 2-120 receives the temperature dependent current I(T) ($I_{PTAT}$) and converts the temperature dependent current $I_{PTAT}$ into a corresponding temperature dependent voltage V(T). The temperature dependent voltage V(T) is provided to the signal generator 230. Since the temperature dependent current $I_{PTAT}$ increases in proportion to the temperature, a level of the temperature dependent voltage V(T) also increases in proportion to the temperature. In another embodiment, the temperature dependent voltage V(T) is inversely proportional to the temperature dependent current I(T).

The signal generator 230 receives the temperature dependent voltage V(T) and a reference voltage V1. The signal generator 230 generates a pulse signal $f_{OSC}$ based on a voltage difference between the temperature dependent voltage V(T) and the reference voltage V1 (i.e., V(T)–V1).

In an embodiment, a level of the reference voltage V1 is kept constant regardless of the temperature, and a level of the temperature dependent voltage V(T) changes linearly as the temperature changes. The voltage difference V(T)–V1 between the two voltage levels also linearly varies as the temperature changes. As a result, the pulse signal $f_{OSC}$ is generated to have a frequency that varies linearly with the temperature.

In another embodiment, the level of the reference voltage V1 changes linearly with the temperature, but have a variable rate that is slower than that of the temperature dependent voltage V(T). The pulse signal $f_{OSC}$ having a frequency that varies linearly with temperature can be generated since the voltage difference V(T)–V1 still changes linearly with the temperature.

Since the frequency of the pulse signal $f_{OSC}$ changes with the temperature, the pulse signal $f_{OSC}$ generated by the signal generator 230 has a variable period. For instance, referring to FIG. 4, if the temperature is relatively high, the signal generator 230 generates a pulse signal ($f_{OSC-H}$) having a relatively long period (i.e., a relatively low frequency). If the temperature is relatively low, the signal generator 230 generates a pulse signal ($f_{OSC-L}$) having a relatively short period, or the period that is shorter than that of the pulse signal $f_{OSC-H}$. If the temperature is intermediate, the signal generator 230 generates a pulse signal ($f_{OSC-A}$) having a period that is between the long period and the short period.

In an embodiment, the signal generator 230 includes an oscillator. An example of such an oscillator is a relaxation oscillator generating a triangular (saw-tooth) waveform with a linear slope.

Figure 3A:
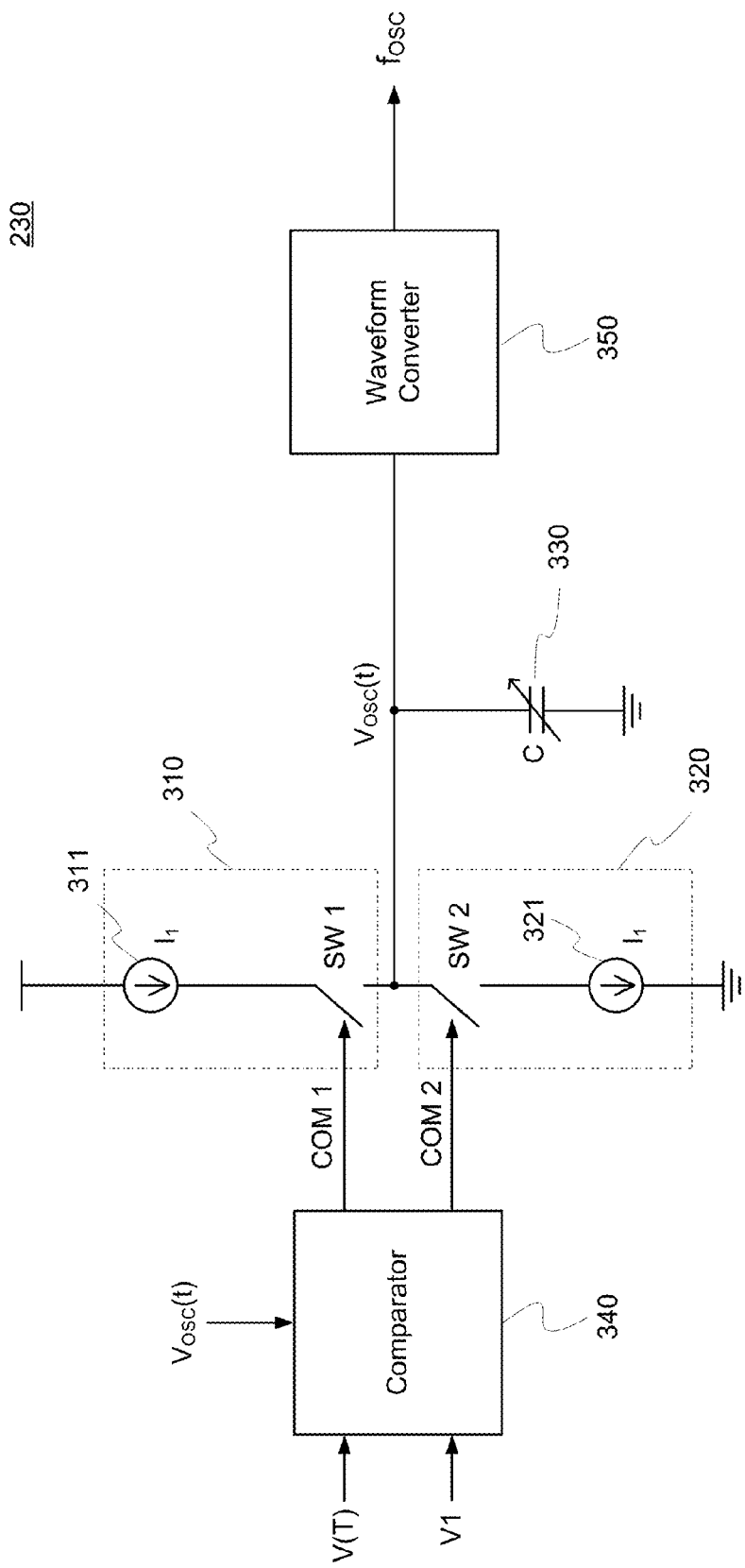
FIG. 3A is a circuit diagram of a signal generator of the temperature sensor embodiment shown in FIG. 2.

A detailed configuration and operation of the signal generator 230 will be described hereinafter with reference to FIGS. 3A and 3B. Referring to FIG. 3A, the signal generator 230 includes first and second driving units 310 and 320, a capacitor 330, a comparator 340, and a waveform converter 350.

The first driving unit 310 charges the capacitor 340, and includes a first current generator 311 and a first switch SW1. The second driving unit 320 discharges the capacitor 330, and includes a second current generator 321 and a second switch SW2.

Each of the first and second current generators 311 and 321 generates substantially the same current ($I_1$). The current $I_1$ is insensitive to temperature. In an embodiment, the current $I_1$ is a poly current. The first and second current generators 311 and 321 may be implemented using constant current sources or variable current sources.

The first and second switches SW1 and SW2 are in an ON or OFF state in response to first and second comparison signals COM1 and COM2, respectively. The first and second switches SW1 and SW2 may be implemented with various types of switching elements, for example a MOS transistor. In an embodiment, the first switch SW1 is implemented using a PMOS transistor, and the second switch SW2 is implemented using an NMOS transistor. In another embodiment, the first switch SW1 and the second switch SW2 are implemented using PMOS transistors. In yet another embodiment, the first switch SW1 and the second switch SW2 are implemented using NMOS transistors.

The capacitor 330 has a capacitance value C and is charged or discharged depending on switching operations of the first and second switches SW1 and SW2, thereby outputting an oscillator output signal having a voltage level $V_{OSC}(t)$. As illustrated in FIG. 3B, the oscillator output signal $V_{OSC}(t)$ has a triangular waveform with a period $t_{OSC}$.

In an embodiment, the period $t_{OSC}$ may be adjusted by modifying the capacitance value C of the capacitor 330 and/or the current value $I_1$. The capacitance value C may be increased to lengthen the period $t_{OSC}$ since the capacitor 330 with a greater capacitance would require longer time to charge and discharge. Accordingly, the oscillator output signal $V_{OSC}(t)$ can be made to change at a slower rate by increasing the capacitance value C of the capacitor 330.

The capacitance value C, however, may be decreased to shorten the period $t_{OSC}$ since the capacitor 330 with a smaller capacitance would require less time to charge and discharge, thereby making the oscillator output signal $V_{OSC}(t)$ change at a faster rate.

In an embodiment, the period $t_{OSC}$ may be adjusted by modifying the current value $I_1$. The speed of charging or discharging the capacitor 330 corresponds to the current value $I_1$. Accordingly, the current value $I_1$ may be increased to shorten the period $t_{OSC}$, or decreased to lengthen the period $t_{OSC}$.

The comparator 340 receives the temperature dependent voltage V(T), the reference voltage V1, and the oscillator output signal having the voltage level $V_{OSC}(t)$. The comparator 340 compares the voltage level $V_{OSC}(t)$ of the oscillator output signal with the temperature dependent voltage V(T) and the reference voltage V1. Based on this comparison, the comparator 340 outputs the first and the second comparison signals COM1 and COM2 that are complementary to each other according to an implementation, e.g., when the first and second switches SW1 and SW2 are of the same type. If the first and second switches SW1 and SW2 are of the complementary types, e.g., PMOS and NMOS transistors, the first and second comparison signals COM1 and COM2 may be the same.

Figure 3B:
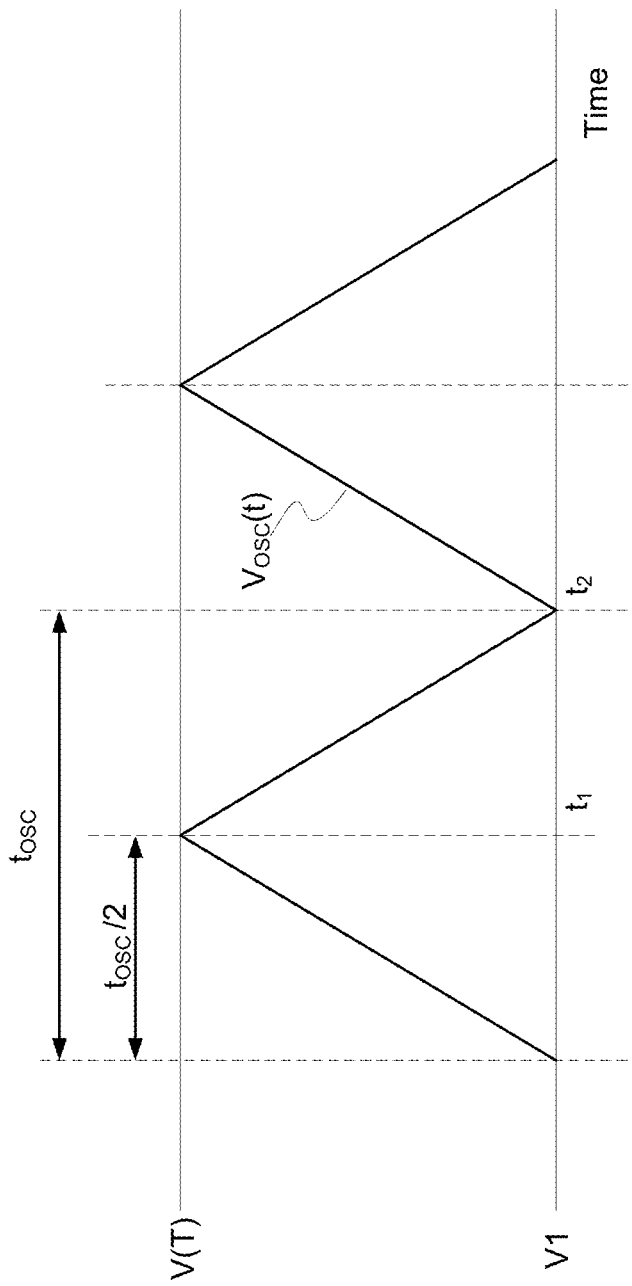
FIG. 3B shows a waveform generated by the signal generator in FIG. 3A.

Referring to FIGS. 3A and 3B, the capacitor 330 is charged if the comparator 340 outputs an enable signal as the first comparison signal COM1 to switch ON the first switch SW1 and a disable signal as the second comparison signal COM2 to switch OFF the second switch SW2. The oscillator voltage level $V_{OSC}(t)$ increases as the capacitor 330 is being charged. The enable signals for the first and second switches SW1 and SW2 may be a high voltage level or low voltage level depending on the type of transistors used. Similarly, the disable signals for the first and second switches SW1 and SW2 may be a high voltage level or low voltage level depending on the type of transistors used.

Thereafter, if the oscillator voltage level $V_{OSC}(t)$ reaches the temperature dependent voltage $V(T)$ at a point of time t1, the comparator 340 outputs a disable signal as the first comparison signal COM1 to switch OFF the first switch SW1 and an enable signal as the second comparison signal COM2 to switch ON the second switch SW2. As a result, the capacitor 330 starts to discharge. The oscillator voltage level $V_{OSC}(t)$ decreases as the capacitor 330 is being discharged.

Once the oscillator voltage level $V_{OSC}(t)$ reaches the reference voltage V1 at a point of time t2, the comparator 340 outputs an enable signal as the first comparison signal COM1 to switch ON the first switch SW1 and a disable signal as the second comparison signal COM2 to switch OFF the second switch SW2. As a result, the capacitor 330 is charged again, and the oscillator voltage level $V_{OSC}(t)$ is increased again.

Through the above switching operations of the first and second switches SW1 and SW2, the oscillator output signal $V_{OSC}(t)$ of the triangular waveform is obtained as shown in FIG. 3B.

The period $t_{OSC}$ of the oscillator output signal $V_{OSC}(t)$ corresponding to a function of the voltage difference $V(T)-V1$ may be determined by the following equations.

$$V(T)-V1=R_1*I_{PTAT}-R_2*I_2 \quad \text{(Equation 1)}$$

In Equation 1, $R_1$ represents a resistance value of the current-to-voltage converter 2-120. $R_2$ and $I_2$ represent a resistance value and a current value of a reference voltage generator (not shown) that generates the reference voltage V1, respectively.

The period $t_{OSC}$ of the oscillator output signal $V_{OSC}(t)$, may be represented in terms of the voltage difference $V(T)-V1$, per the following equation.

$$I_1*(t_{OSC}/2)=C*(V(T)-V1) \quad \text{(Equation 2)}$$

By replacing the voltage difference $V(T)-V(1)$ with Equation 1 and rearranging the terms, the following equation is obtained.

$$t_{OSC}=2*R_1*C*(I_{PTAT}-k*I_2)/I_1 \quad \text{(Equation 3)}$$

In Equation 3, k represents a ratio of $R_2$ to $R_1$. i.e., $(R_2/R_3)$. Therefore, if values of $R_1$, $R_2$, C, $I_1$, and $I_2$ are kept constant, a slope of the triangular waveform $V_{OSC}(t)$ is maintained even if there is a temperature change.

Because the voltage difference $V(T)-V1$ varies linearly with the temperature, the period $t_{OSC}$ of the oscillator output signal $V_{OSC}(t)$ also varies linearly with the temperature. In order to adjust the slope of the triangular waveform $V_{OSC}(t)$, the first current generator 311, the second current generator 321, and/or the capacitor 330 may be implemented with a variable component.

In this manner, the period $t_{OSC}$ of the oscillator output signal $V_{OSC}(t)$ can be adjusted at a certain temperature. This mechanism can be used for offset calibration, and will be described later.

In an embodiment, the magnitude of an increasing slope and that of a decreasing slope of the triangular waveform $V_{OSC}(t)$ are substantially the same since the first and second current generators 311 and 321 provide the same current value $I_1$ to charge and discharge the capacitor 330.

However, in another embodiment, the first and second current generators 311 and 321 may provide different current values from each other. In such an embodiment, the magnitude of the increasing slope and that of the decreasing slope of the triangular waveform $V_{OSC}(t)$ may be different from each other.

In an embodiment, the waveform converter 350 receives the oscillator output signal $V_{OSC}(t)$ having the triangular waveform, and converts the oscillator output signal $V_{OSC}(t)$ into the pulse signal $f_{OSC}$ having a rectangular waveform. The frequency and period of the pulse signal $f_{OSC}$ may be substantially the same as those of the oscillator output signal $V_{OSC}(t)$.

Referring back to FIGS. 2 and 3A, the signal generator 230 has been described in connection with the temperature dependent voltage $V(T)$ that is generated based on the poly current proportional to temperature $I_{PTAT}$. However, in another embodiment, if the temperature dependent voltage $V(T)$ is generated based on the poly current inversely proportional to temperature $I_{CTAT}$, the reference voltage V1 has a level higher than that of the temperature dependent voltage $V(T)$. Thus, a voltage difference $V1-V(T)$ increases linearly as the temperature increases.

In still another embodiment, the reference voltage V1 decreases linearly, as the temperature increases, with a rate that is slower than that of the temperature dependent voltage $V(T)$. However, even if the reference voltage V1 decreases with the temperature, the voltage difference $V1-V(T)$ still varies linearly with the temperature. Accordingly, the pulse signal $f_{OSC}$ can be generated to have a frequency that varies linearly with the temperature.

Referring back to FIG. 2, the counter 240 receives the pulse signal $f_{OSC}$ and a reference clock signal $f_{REF}$. The counter 240 counts the number of cycles of the reference clock signal $f_{REF}$ that corresponds to one cycle (i.e., the period) of the pulse signal $f_{OSC}$, and generates an N-bit temperature code Tcode based on the number counted by the counter 240, where N is an integer.

In an embodiment, the reference clock signal $f_{REF}$ is generated using a crystal oscillator, and the reference clock signal $f_{REF}$ has a fixed period. That is, the frequency of the reference clock signal $f_{REF}$ remains the same even if there is a temperature change. The frequency of the reference clock signal $f_{REF}$ may be between 1~100 MHz.

Unlike the frequency of the reference clock signal $f_{REF}$, the period of the pulse signal $f_{OSC}$ varies with the temperature, e.g., increases in proportion to the temperature increase. The frequency of the pulse signal $f_{OSC}$ may be in a range of KHz to MHz, which is significantly lower than that of the reference clock signal $f_{REF}$.

Figure 4:
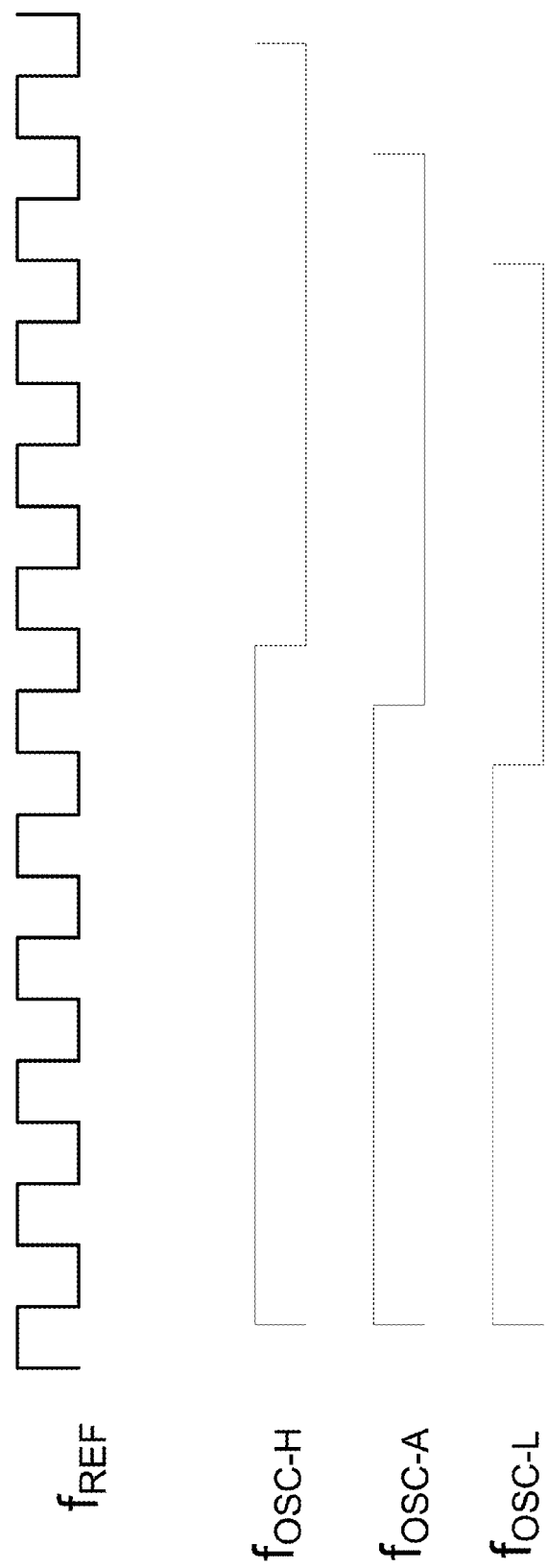
FIG. 4 is a timing diagram of operation of the temperature sensor embodiment of FIG. 2.

FIG. 4 shows a timing diagram of an operation of the temperature sensor device 200 of FIG. 2. For illustrative convenience, the frequencies of the pulse signal $f_{OSC}$ and the reference clock signal $f_{REF}$ are not drawn to their actual frequency differences.

Figure 5:
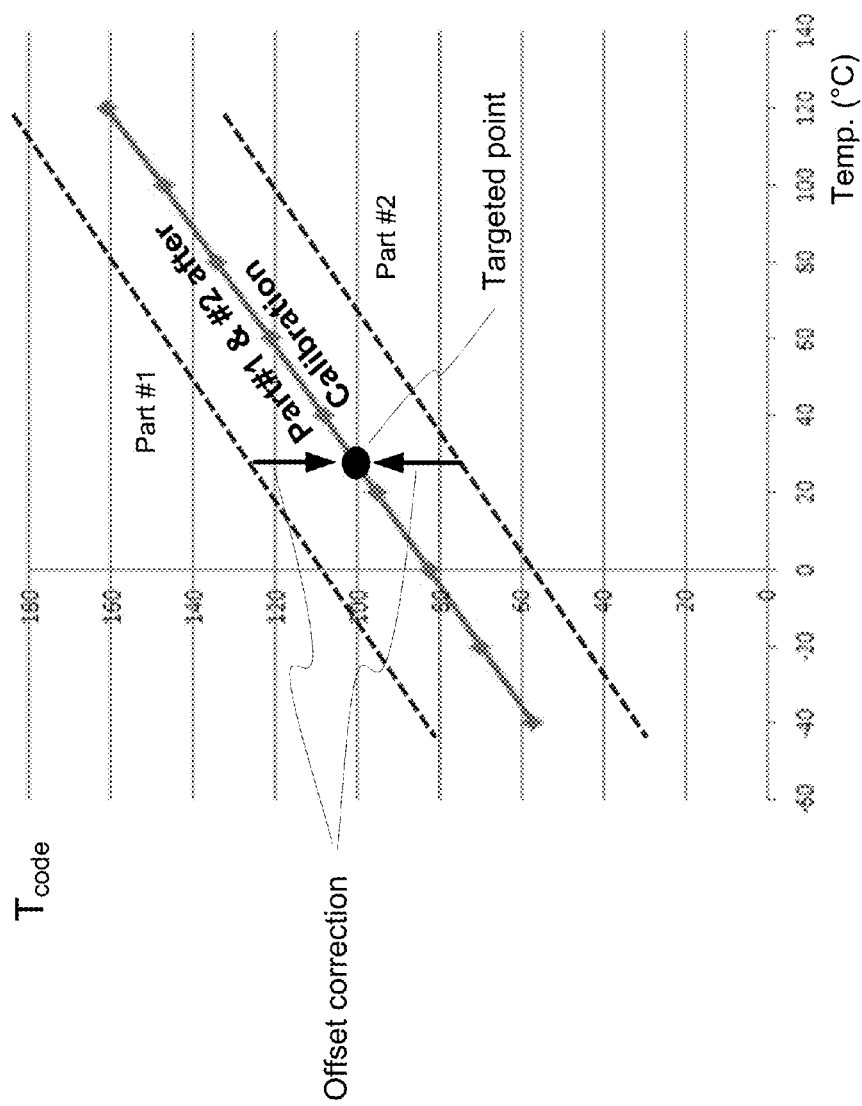
FIG. 5 plots temperature code changing with temperature.

In an operation, the counter 240 receives a pulse signal $f_{OSC}$ having a period that varies with the temperature (e.g., $f_{OSC-H}$, $f_{OSC-A}$, or $f_{OSC-L}$). The counter 240 counts the number of clock cycles for the reference clock signal $f_{REF}$ that corresponds to a single cycle for the pulse signal $f_{OSC}$, and then outputs the counted clock cycles as a counted value. If the temperature is high, the counter 240 outputs a larger counted value since the pulse signal $f_{OSC-H}$ inputted to the counter 240 has a longer period. On the other hand, if the temperature is low, the counter 240 outputs a smaller counted value since the pulse signal $f_{OSC-L}$ has a shorter period. The counted value is output as an N-bit temperature code Tcode. FIG. 5 plots the change of the temperature code according to the temperature change. The N-bit temperature code Tcode has different bit values depending on whether the counted value is a larger value or smaller value.

In summary, as the temperature increases, the following also increases:
Level of the temperature dependent current $I_{PTAT}$
Level of the temperature dependent voltage V(T)
Period of the oscillator output signal $V_{OSC}(t)$
Period of the pulse signal $f_{OSC}$
Counted value As a result, the counter 240 outputs the temperature code Tcode having a higher bit value when the temperature is increased. The temperature code Tcode increases linearly as the temperature increases. See FIG. 5.

FIG. 5 also illustrates the temperature code Tcode as a function of temperatures and explains an offset calibration method performed for the temperature sensor device 200. The temperature code Tcode deviates from a desired code value, i.e., a targeted point, if there is an offset for the temperature code Tcode. Such an offset commonly results from manufacturing process variation.

Dash line Part#1, Part#2 illustrates a temperature code Tcode that has deviated from a targeted point, e.g., 25 degrees Celsius. A difference between the targeted point and the actual temperature code Tcode is compensated for by using an offset calibration (or offset correction operation) that adjusts the temperature code Tcode to the targeted point.

Referring back to FIG. 3A, the offset calibration can be performed by tuning the capacitor 330 and/or the first and second current generators 311 and 321 included in the signal generator 230. For example, by changing the capacitance C of the capacitor 330, the period $t_{OSC}$ of the oscillator output signal $V_{OSC}(t)$ changes based on Equation 3 above. Thus, the period of the pulse signal $f_{OSC}$ corresponding to the period $t_{OSC}$ of the oscillator output signal $V_{OSC}(t)$ also changes. Alternatively, the current values $I_1$ from the first and second current generators 311 and 321 may be adjusted to change the period of the pulse signal $f_{OSC}$. The counted value (or counted number), e.g., the temperature code Tcode, would change based on the variable period of the pulse signal $f_{OSC}$. This offset calibration may be completed before the temperature sensor device 200 operates in a normal mode.

Figure 6:
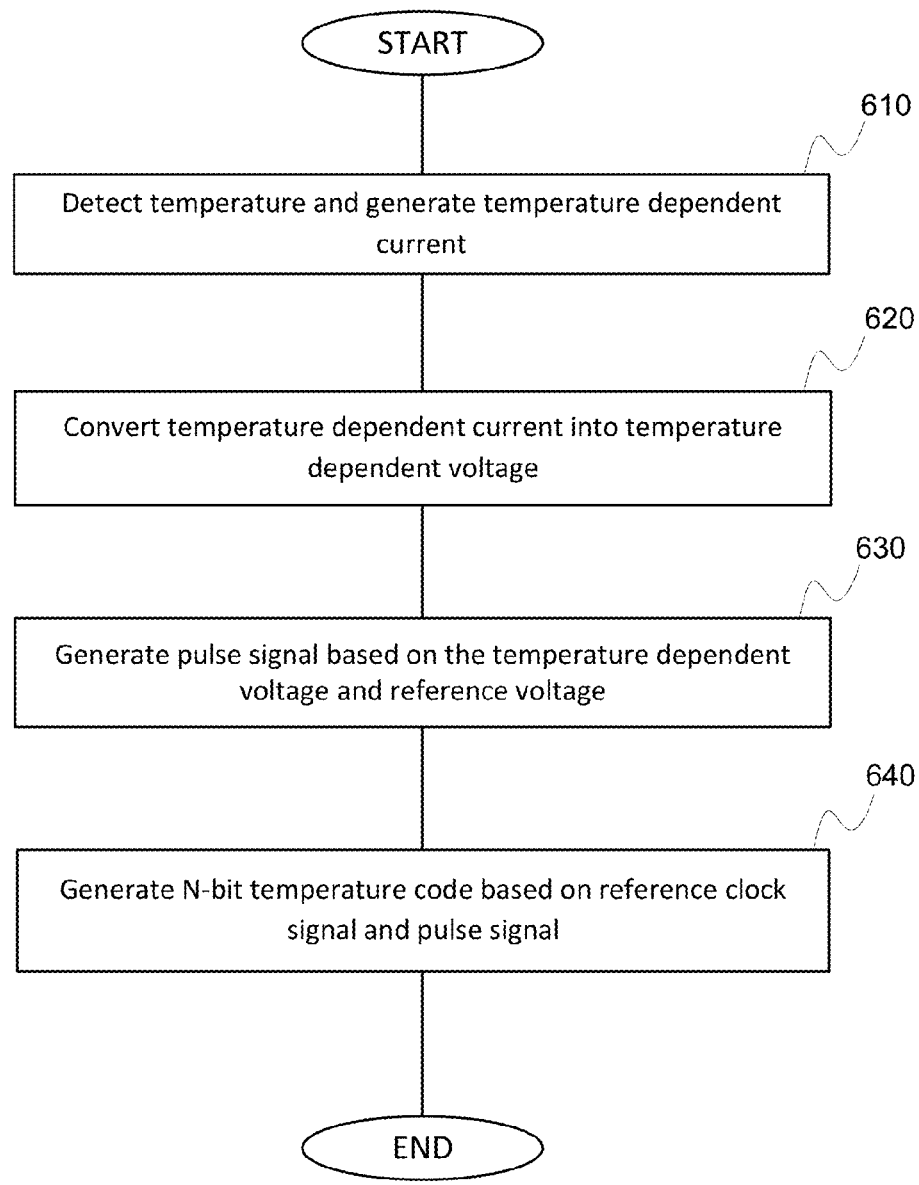
FIG. 6 is a flowchart illustrating a temperature sensing method in accordance with an embodiment.

FIG. 6 is a flowchart illustrating a temperature sensing method in accordance with an embodiment of the present disclosure. At 610, a temperature is sensed. A current (hereinafter referred to as "temperature dependent current") corresponding to the detected temperature is generated.

At 620, the temperature dependent current is converted into a temperature dependent voltage. The temperature dependent voltage corresponds to the temperature detected at 610. For example, the temperature dependent voltage has about 500 mV.

At 630, an oscillator output signal having a triangular waveform is generated based on the temperature dependent voltage and a reference voltage. A voltage level of the oscillator output signal varies between the temperature dependent voltage and the reference voltage, e.g., V1 to V(T) in FIG. 3B. The oscillator output signal has a period that varies according to the temperature. In an embodiment, the oscillator output signal is converted into a pulse signal having a rectangular waveform. A period of the pulse signal is substantially the same as that of the oscillator output signal.

In an embodiment, the magnitude of an increasing slope and that of a decreasing slope of the triangular waveform are substantially the same. However, in another embodiment, they may be different from each other.

At 640, the pulse signal is compared with a reference clock signal. A number of clock cycles of the reference clock signal corresponding to a single cycle of the pulse signal is counted. An N-bit temperature code is generated based on the counted value of the clock cycles, where N is an integer. The reference clock signal has a frequency that remains constant even if there is a temperature change.

Although not shown in FIG. 6, the temperature sensing method may further include performing offset calibration for the N-bit temperature code. This may involve adjusting the slopes of the triangular waveform. The slopes adjusted may be increasing or decreasing slopes.

According to embodiments, it may be possible to simply implement a temperature sensor device by using a signal generator that includes an oscillator structure having a linear triangular (saw-tooth) waveform.

In addition, while the offset calibration is performed in a digital domain at an ADC back-end in a conventional temperature sensor device, the offset calibration of a temperature sensor device disclosed herein is performed by tuning a capacitor and/or current sources that are included in a signal generator. Therefore, according to an embodiment of the present disclosure, the offset calibration is performed more precisely without increasing structural complexity of the temperature sensor device.

The temperature sensor device according to an embodiment of the present disclosure can be included in various types of semiconductor chips or systems in order to enable this to sense a temperature thereof. The chips or systems can use the sensed temperature to perform their operations accordingly.

Although the subject matter has been described in language specific to structural features and/or methodological techniques and/or acts, it is to be understood that the subject matter defined in the appended claims is not necessarily limited to the specific features, techniques, or acts described above, including orders in which they are performed.

What is claimed is:

1. A device comprising: a signal generator to receive an input voltage indicative of a temperature and generate a pulse signal having a period determined from the input voltage; and a counter to output a temperature code based on the pulse signal, the temperature code being indicative of the temperature, wherein the signal generator comprises a comparator to receive the input voltage and an oscillator output signal, to compare the input voltage with the oscillator output signal, and to output a comparison signal that causes a change in a value of the oscillator output signal, wherein the signal generator further comprises: a capacitor to be charged or discharged according to the comparison signal output from the comparator, the capacitor being coupled to an output node through which the oscillator output signal is output; and a waveform converter coupled to the capacitor and to convert the oscillator output signal having a triangular waveform into the pulse signal having a rectangular waveform, the oscillator output signal having a period that is substantially the same as the period of the pulse signal.

2. The device of claim 1 wherein the signal generator comprises a linear oscillator structure.

3. The device of claim 1, wherein the period of the pulse signal is proportional to the input voltage.

4. The device of claim 1, further comprising:
a temperature sensor to output a temperature dependent current indicative of the temperature; and a current-to-voltage converter to convert the temperature dependent current into a temperature dependent voltage corresponding to the temperature dependent current.

5. The device of claim 4, wherein the input voltage is a difference between the temperature dependent voltage and a reference voltage, the reference voltage having a level that is substantially constant regardless of the temperature.

6. The device of claim 4, wherein the temperature dependent voltage is proportional to the temperature dependent current.

7. The device of claim 1, wherein the signal generator further comprises:
   a first driving unit coupled to and provided between a power supply terminal and the output node, the first driving unit to provide a first current to charge the capacitor; and
   a second driving unit coupled to and provided between the output node and a ground terminal, the second driving unit to discharge a second current from the capacitor,
   wherein the first driving unit and the second driving unit are activated in a complementary manner in response to the comparison signal of the comparator.

8. The device of claim 7, wherein, when the temperature code has an offset, a capacitance value of the capacitor is adjusted to compensate for the offset.

9. The device of claim 7, wherein the comparison signal includes first and second comparison signals,
   wherein the first driving unit includes a first current generator and a first switching element, the first switching element coupling the first current generator to the capacitor when the first comparison signal has a first value and the second comparison signal has a second value, and
   wherein the second driving unit includes a second current generator and a second switching element, the second switching element coupling the second current generator to the capacitor when the first comparison signal has the second value and the second comparison signal has the first value.

10. The device of claim 1, wherein the counter counts a number of cycles of a reference clock signal that occur during a single cycle of the pulse signal, and
    wherein the temperature code is generated based on the counted number.

11. A method, comprising: receiving an input voltage indicative of a temperature; comparing the input voltage with an oscillator output signal; outputting a comparison signal that causes a change in a value of the oscillator output signal; generating a pulse signal having a period determined from the input voltage; outputting a temperature code based on the pulse signal, the temperature code being indicative of the temperature; charging or discharging a capacitor according to the comparison signal output from the comparator, the capacitor being coupled to an output node through which the oscillator output signal is output; and converting the oscillator output signal having a triangular waveform into the pulse signal having a rectangular waveform, the oscillator output signal having a period that is substantially the same as the period of the pulse signal.

12. The method of claim 11, wherein the period of the pulse signal is proportional to the input voltage.

13. The method of claim 11, further comprising:
    outputting a temperature dependent current indicative of the temperature; and
    converting the temperature dependent current into a temperature dependent voltage.

14. The method of claim 13, wherein the input voltage is a difference between the temperature dependent voltage and a reference voltage, the reference voltage having a level that is substantially constant regardless of the temperature.

15. The method of claim 14, wherein the temperature dependent voltage is proportional to the temperature dependent current.

16. The method of claim 11, wherein outputting the temperature code comprises:
    counting a number of cycles of a reference clock signal that occur during a single cycle of the pulse signal; and
    outputting the temperature code corresponding to the counted number.

17. The method of claim 11, further comprising performing offset calibration for the temperature code by adjusting a capacitance value of the capacitor.

18. The method of claim 11, wherein the comparison signal includes first and second comparison signals, the method further comprising:
    coupling a first current generator to the capacitor when the first comparison signal has a first value and the second comparison signal has a second value; and
    coupling a second current generator to the capacitor when the first comparison signal has the second value and the second comparison signal has the first value.

* * * * *